United States Patent
Kim et al.

(10) Patent No.: US 8,355,746 B2
(45) Date of Patent: Jan. 15, 2013

(54) METHOD AND APPARATUS FOR TRANSMITTING AND RECEIVING GROUP RESOURCE DEALLOCATION INFORMATION IN A COMMUNICATION SYSTEM

(75) Inventors: Se-Ho Kim, Seoul (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 12/814,571

(22) Filed: Jun. 14, 2010

(65) Prior Publication Data

US 2010/0317389 A1      Dec. 16, 2010

(30) Foreign Application Priority Data

Jun. 12, 2009   (KR) .................. 10-2009-0052522

(51) Int. Cl.
*H04B 7/00* (2006.01)
*H04W 4/00* (2009.01)
*H04L 12/66* (2006.01)

(52) U.S. Cl. ........ 455/525; 455/509; 455/466; 370/329; 370/352

(58) Field of Classification Search .................. 455/525, 455/509, 466; 370/329, 352
See application file for complete search history.

(56) References Cited

U.S. PATENT DOCUMENTS

| | | | |
|---|---|---|---|
| 5,490,280 A * | 2/1996 | Gupta et al. ..................... 712/23 |
| 6,671,511 B1 * | 12/2003 | Forssell et al. ............. 455/452.1 |
| 8,054,747 B1 * | 11/2011 | Lewis et al. .................... 370/232 |
| 2002/0045458 A1 * | 4/2002 | Parantainen et al. ......... 455/466 |
| 2003/0134662 A1 * | 7/2003 | Shah et al. ..................... 455/560 |
| 2007/0230412 A1 * | 10/2007 | McBeath et al. .............. 370/338 |
| 2008/0025247 A1 * | 1/2008 | McBeath et al. .............. 370/321 |
| 2008/0090584 A1 * | 4/2008 | Kim et al. .................. 455/452.2 |
| 2008/0233936 A1 * | 9/2008 | Rajan et al. .................... 455/417 |
| 2009/0073928 A1 * | 3/2009 | Power et al. .................. 370/329 |
| 2009/0103487 A1 * | 4/2009 | Oh et al. ........................ 370/329 |
| 2009/0135807 A1 * | 5/2009 | Shrivastava et al. .......... 370/352 |
| 2009/0154418 A1 * | 6/2009 | Kang et al. ..................... 370/329 |
| 2009/0191860 A1 * | 7/2009 | Oh et al. ........................ 455/423 |
| 2009/0252089 A1 * | 10/2009 | Lim et al. ....................... 370/328 |
| 2010/0034303 A1 * | 2/2010 | Damnjanovic et al. ........ 375/260 |
| 2010/0220683 A1 * | 9/2010 | Novak et al. ................... 370/330 |
| 2010/0260128 A1 * | 10/2010 | Cho et al. ....................... 370/329 |
| 2010/0266057 A1 * | 10/2010 | Shrivastava et al. .......... 375/260 |
| 2011/0092242 A1 * | 4/2011 | Parkvall et al. ............... 455/509 |
| 2011/0212731 A1 * | 9/2011 | Lee et al. ....................... 455/450 |
| 2011/0255518 A9 * | 10/2011 | Agrawal et al. ............... 370/335 |

OTHER PUBLICATIONS

Hamiti, IEEE 802.16m System Description Document [Draft], IEEE 802.16 Broadband Wireless Access Working Group <http://ieee802.org/16>, IEEE 802.16m-08/003r9a, Revised version of IEEE 802.16m-08/003r8, May 31, 2009.

Part 16: Air Interface for Fixed and Mobile Broadband Wireless Access Systems, Advanced Air Interface (working document), IEEE 802.16m-09/0010r1a, Mar. 2008.

* cited by examiner

*Primary Examiner* — Bobbak Safaipour
(74) *Attorney, Agent, or Firm* — Jefferson IP Law, LLP

(57) ABSTRACT

A method and apparatus for transmitting and receiving group resource deallocation information in a communication system are provided. The method in a base station includes transmitting group resource deallocation information, which includes information indicating a group including a plurality of Mobile Stations (MSs) receiving the group resource deallocation information, and information indicating whether a resource is allocated to each of the MSs.

20 Claims, 8 Drawing Sheets

METHOD AND APPARATUS FOR TRANSMITTING AND RECEIVING GROUP RESOURCE DEALLOCATION INFORMATION IN A COMMUNICATION SYSTEM

PRIORITY

This application claims the benefit under 35 U.S.C. §119 (a) of a Korean patent application filed in the Korean Intellectual Property Office on Jun. 12, 2009 and assigned Serial No. 10-2009-0052522, the entire disclosure of which is hereby incorporated by reference.

BACKGROUND OF THE INVENTION

1. Field of the Invention

The present invention relates to a method and apparatus for transmitting and receiving group resource deallocation information in a communication system. More particularly, the present invention relates to a method and apparatus for transmitting and receiving group resource deallocation information in a communication system using a group resource allocation scheme.

2. Description of the Related Art

Next-generation communication systems have evolved to offer various high-speed, high-capacity services to Mobile Stations (MSs). Typical examples of next-generation communication systems include an Institute of Electrical and Electronics Engineers (IEEE) 802.16 communication system and a Mobile Worldwide Interoperability for Microwave Access (WiMAX) communication system. The Mobile WiMAX communication system is a communication system based on the IEEE 802.16 communication system.

The IEEE 802.16m communication system is an example of an IEEE 802.16 communication system. The IEEE 802.16m communication system uses both an individual resource allocation scheme and a group resource allocation scheme as resource allocation schemes. The individual resource allocation scheme allocates resources to MSs on an individual basis. The group resource allocation scheme groups multiple MSs into a group and allocates resources to MSs in the group. For sake of convenience, resource allocation information for the resources allocated using the individual resource allocation scheme is referred to as 'individual resource allocation information', and when the resources allocated using the individual resource allocation scheme are deallocated, the resource deallocation information is referred to as 'individual resource deallocation information'. Similarly, resource allocation information for the resources allocated using the group resource allocation scheme is referred to as 'group resource allocation information', and when the resources allocated using the group resource allocation scheme are deallocated, the resource deallocation information is referred to as 'group resource deallocation information'.

Related methods for transmitting the individual resource allocation information, the individual resource deallocation information, the group resource allocation information, and the group resource deallocation information will be described below.

First, related methods of transmitting the individual resource allocation information and the individual resource deallocation information will be described below.

After allocating resources to each of a plurality of MSs, a Base Station (BS) sends the MSs a resource allocation message that includes an Information Element (IE) indicating individual resource allocation information for the allocated resources, i.e., an individual resource allocation IE. For sake of convenience, the resource allocation message including the individual resource allocation IE will be referred to as an 'individual resource allocation message', and the individual resource allocation message may be realized as, for example, a MAP message. In contrast, the BS deallocates the resources allocated to a particular MS among the MSs that have already been allocated resources, and then sends the MS a resource deallocation message that includes an IE indicating individual resource deallocation information for the deallocated resources, i.e., an individual resource deallocation IE. For sake of convenience, the resource deallocation message including the individual resource deallocation IE will be referred to as an 'individual resource deallocation message', and the individual resource deallocation message may also be realized as, for example, a MAP message.

Second, related methods of transmitting the group resource allocation information and the group resource deallocation information will be described below.

The BS selects MSs according to a service type or a Modulation and Coding Scheme (MCS) and groups the selected MSs. The BS generates a group resource allocation IE with group resource allocation information for MSs in the group, and sends a resource allocation message including the group resource allocation IE to the MSs in the group. For sake of convenience, the resource allocation message including the group resource allocation IE will be referred to as a 'group resource allocation message', and the group resource allocation message may be realized as, for example, a MAP message. Because the group resource allocation IE includes group resource allocation information for multiple MSs in the group, an MCS level to be applied to the group resource allocation IE is determined based on the MS with the lowest required MCS level among the MSs that will receive the group resource allocation IE. In addition, since all the MSs in the group should successfully receive the group resource allocation IE, transmit power to be applied to the group resource allocation IE should be set relatively high. Furthermore, since the group resource allocation IE includes group resource allocation information for multiple MSs, its length is relatively long.

In contrast, the BS deallocates the resources allocated to a particular MS among the MSs that have already been allocated resources, and then sends multiple MSs in the group a resource deallocation message that includes an IE indicating group resource deallocation information indicating the deallocation of the resources allocated to the particular MS, i.e., a group resource deallocation IE. For sake of convenience, the resource deallocation message including the group resource deallocation IE will be referred to as a 'group resource deallocation message', and the group resource deallocation message may also be realized as, for example, a MAP message. Similarly, even for the group resource deallocation IE, an MCS level to be applied is determined based on the MS with the lowest required MCS level among the MSs in the group. Transmit power to be applied is set relatively high, and its length is also relatively long.

As described above, regarding the group resource deallocation IE, its length is long, the lowest MCS level among the required MCS levels of MSs that will receive the group resource deallocation IE should be applied, and relatively high transmit power should be used. Hence, many resources are consumed for transmission/reception of the group resource deallocation IE, which increases system overhead. Therefore, there is a need to reduce the amount of required resources for transmission and reception of a group resource deallocation IE in the IEEE 802.16m communication system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for transmitting and receiving group resource deallocation information in a communication system.

Another aspect of the present invention is to provide a method and apparatus for transmitting and receiving group resource deallocation information to reduce the entire system overhead in a communication system.

In accordance with an aspect of the present invention, a method for transmitting group resource deallocation information by a Base Station (BS) in a communication system is provided. The method includes transmitting group resource deallocation information, which includes information indicating a group including a plurality of Mobile Stations (MSs) receiving the group resource deallocation information, and information indicating whether a resource is allocated to each of the MSs.

In accordance with another aspect of the present invention, a method for receiving group resource deallocation information by an MS in a communication system is provided. The method includes receiving group resource deallocation information, which includes information indicating a group including a plurality of MSs receiving the group resource deallocation information, and information indicating whether a resource is allocated to each of the MSs.

In accordance with still another aspect of the present invention, a Base Station (BS) in a communication system is provided. The BS includes a transmission unit for transmitting group resource deallocation information, which includes information indicating a group including a plurality of MSs receiving the group resource deallocation information, and information indicating whether a resource is allocated to each of the MSs.

In accordance with a yet another aspect of the present invention, a Mobile Station (MS) in a communication system is provided. The MS includes a reception unit for receiving group resource deallocation information, which includes information indicating a group including a plurality of MSs receiving the group resource deallocation information, and information indicating whether a resource is allocated to each of the MSs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for transmitting and receiving group resource deallocation information in a communication system that uses a group resource allocation scheme. In the following description, the communication system is assumed to be an Institute of Electrical and Electronics Engineers (IEEE) 802.16m communication system. However, the group resource deallocation information transmission/reception method and apparatus proposed by the present invention may be used not only in the IEEE 802.16m communication system but also in other communication systems like the Mobile Worldwide Interoperability for Microwave Access (WiMAX) communication system.

Figure 1:
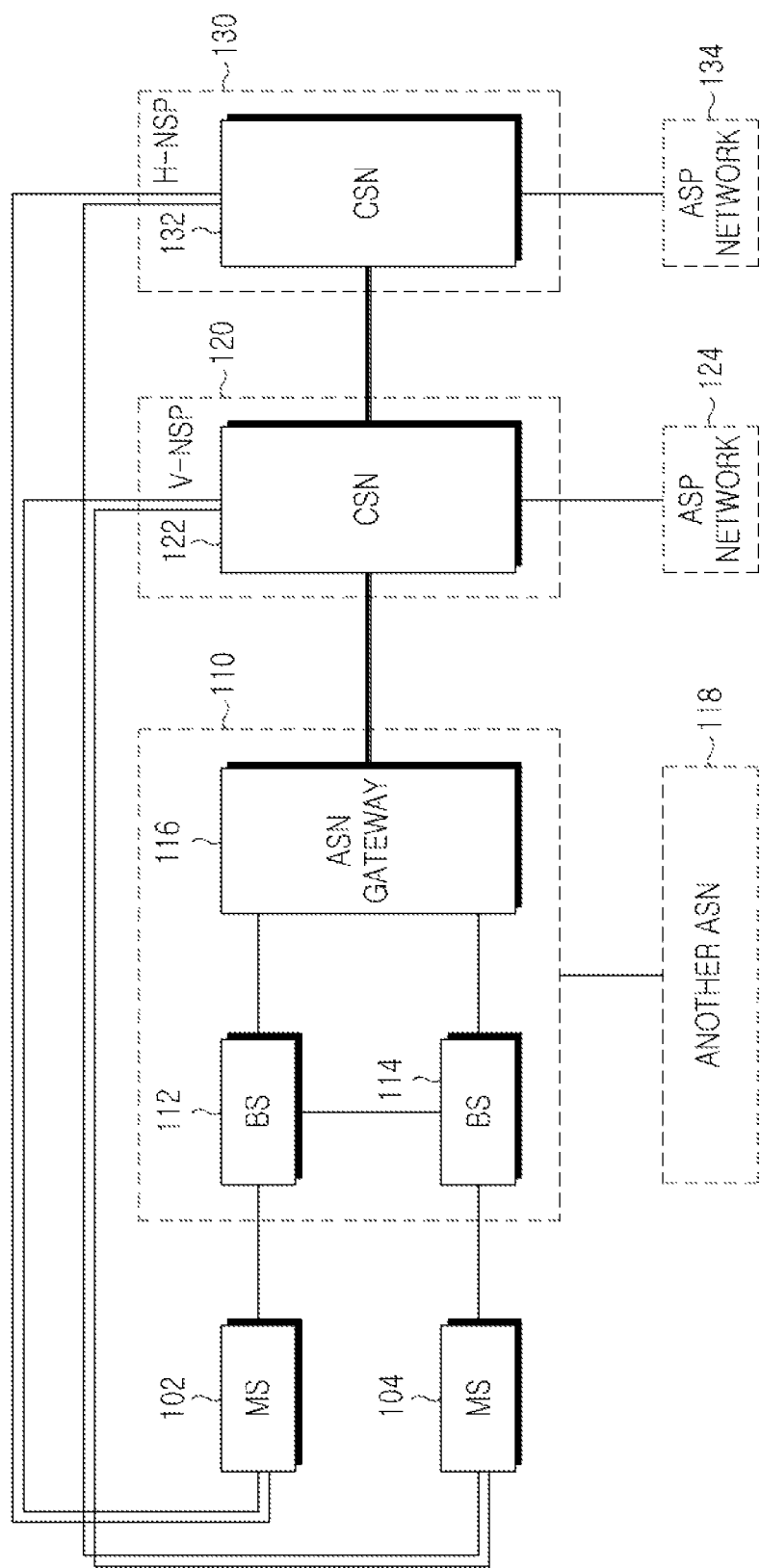
FIG. 1 illustrates an Institute of Electrical and Electronics Engineers (IEEE) 802.16m communication system according to an exemplary embodiment of the present invention.

FIG. 1 illustrates an IEEE 802.16m communication system according to an exemplary embodiment of the present invention.

Referring to FIG. 1, the IEEE 802.16m communication system includes one or more Mobile Stations (MSs) 102 and 104, one or more Access Service Networks (ASNs) 110 and 118, and one or more Connectivity Service Networks (CSNs) 122 and 132.

The CSNs 122 and 132 each are included in a Home Network Service Provider (H-NSP) 130 or a Visited Network Service Provider (V-NSP) 120, in which the MSs 102 and 104 are registered, and may access associated Access Service Providers (ASPs) 124 and 134, like the Internet.

The ASN 110 includes function blocks for performing a network function of offering wireless access to users carrying the MSs 102 and 104. More specifically, the ASN 110 sets Layer-1 and Layer-2 connections for the MSs 102 and 104 and sets Layer-3 connections for the NSPs 120 and 130 in order to support the MSs 102 and 104 so that they can access the network. Also, the ASN 110 performs wireless resource management for effective wireless communication of the MSs 102 and 104. For mobility management, the ASN 110 provides functions such as ASN anchored mobility, CSN anchored mobility, paging, ASN-CSN tunneling, and the like. To this end, the ASN 110 includes one or more Base Stations (BSs) 112 and 114 for connecting with the MSs 102 and 104, and at least one ASN gateway 116 for connecting with the NSPs 120 and 130.

The CSNs 122 and 132 include function blocks for performing a network function of offering IP connectivity services to users carrying the MSs 102 and 104. More specifically, the CSNs 122 and 132 assign IP addresses and endpoint parameters for user sessions to the MSs 102 and 104, support ASN-CSN tunneling and inter-CSN tunneling, and manage inter-ASN mobility.

Next, a frame structure of an IEEE 802.16m communication system according to an exemplary embodiment of the present invention will be described with reference to FIG. 2.

Figure 2:
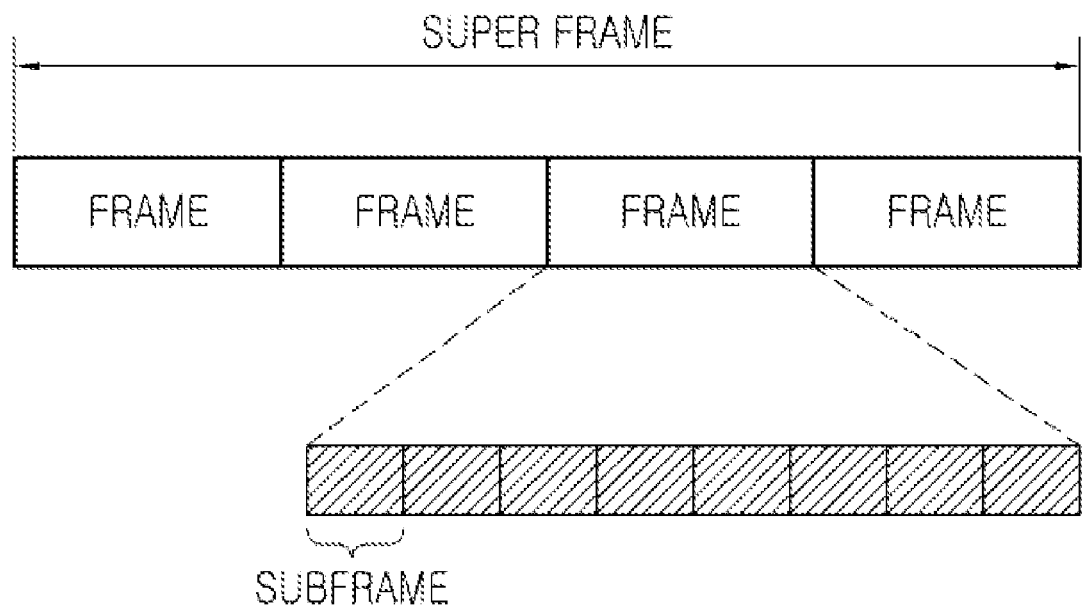
FIG. 2 is a diagram showing a frame structure of an IEEE 802.16m communication system according to an exemplary embodiment of the present invention.

FIG. 2 shows a frame structure of an IEEE 802.16m communication system according to an exemplary embodiment of the present invention.

Referring to FIG. 2, one super frame includes a plurality of frames, each of which includes a plurality of subframes. Each of the subframes includes a plurality of Orthogonal Frequency Division Multiple Access (OFDMA) symbols.

The IEEE 802.16m communication system uses an individual resource allocation scheme and a group resource allocation scheme as a resource allocation scheme. As an example, resource allocation is performed on resources in the subframes and is performed in units of Resource Blocks (RBs). That is, a BS allocates n RBs (where n is an integer greater than or equal to 1) to MSs.

The manner in which the BS sends a resource allocation message and a resource deallocation message depends on whether the IEEE 802.16m communication system uses the individual resource allocation scheme or the group resource allocation scheme, and a description of an exemplary embodiment thereof will be given below. For sake of convenience, resource allocation information for the resources allocated using the individual resource allocation scheme is referred to as 'individual resource allocation information'. Also, when the resources allocated using the individual resource allocation scheme are deallocated, the resource deallocation information is referred to as 'individual resource deallocation information'. Similarly, resource allocation information for the resources allocated using the group resource allocation scheme is referred to as 'group resource allocation information', and when the resources allocated using the group resource allocation scheme are deallocated, the resource deallocation information is referred to as 'group resource deallocation information'. A resource allocation message with an individual resource allocation Information Element (IE) is referred to as an 'individual resource allocation message', a resource deallocation message with an individual resource deallocation IE is referred to as an 'individual resource deallocation message', a resource allocation message with a group resource allocation IE is referred to as a group resource allocation message, and a resource deallocation message with a group resource deallocation IE is referred to as a 'group resource deallocation message'. The individual resource allocation message, the individual resource deallocation message, the group resource allocation message, and the group resource deallocation message may be realized as, for example, a MAP message.

First, exemplary methods of sending an individual resource allocation message and an individual resource deallocation message will be described.

A MAP message including individual resource allocation information, i.e., an individual resource allocation IE, or individual resource deallocation information, i.e., an individual resource deallocation IE, is transmitted on a subframe basis. Each of multiple individual resource allocation IEs or multiple individual resource deallocation IEs in the MAP message undergoes Cyclic Redundancy Check (CRC) processing using a masked sequence assigned to the MSs that should receive the MAP IEs. Hence, each MS may determine whether each of the individual resource allocation IEs or the individual resource deallocation IEs is an individual resource allocation IE or an individual resource deallocation IE targeting the MS itself, by checking CRC using the sequence assigned to the MS. A method of coding the individual resource allocation IE or the individual resource deallocation IE targeting the MS, using the sequence assigned to the MS, is referred to as a separate coding scheme.

Second, exemplary methods of sending a group resource allocation message and a group resource deallocation message will be described.

A MAP message including a group resource allocation IE or a group resource deallocation IE is transmitted on a sub-frame basis. The group resource allocation IE or group resource deallocation IE in the MAP message undergoes CRC processing using a masked sequence assigned to the group that should receive the group resource allocation IE or the group resource deallocation IE. Therefore, each of MSs in the group may determine whether the group resource allocation IE or the group resource deallocation IE is a group resource allocation IE or a group resource deallocation IE targeting the group, by checking CRC using the masked sequence assigned to the group.

The MAP message with the individual resource allocation IE or the individual resource deallocation IE may be transmitted over, for example, a User Specific Control Channel (USCCH). The MAP message with the group resource allocation IE or the group resource deallocation IE may also be transmitted over, for example, the USCCH.

An exemplary format of the group resource deallocation IE will be described with reference to Table 1.

Bitmap, 'User Bitmap' is a bitmap indicating scheduled MSs in the group, 'Resource Assignment Bitmap' is a bitmap indicating a Modulation and Coding Scheme (MCS) and a resource size for each of the scheduled MSs, 'Padding' indicates padding bits, and 'MCRC' indicates masked CRC.

An exemplary method in which the BS transmits information about the MSs subjected to resource deallocation using a group resource deallocation IE with NDA and User Bitmap Index in the IEEE 802.16m communication system according to an exemplary embodiment of the present invention will be described with reference to FIG. 3.

Figure 3:
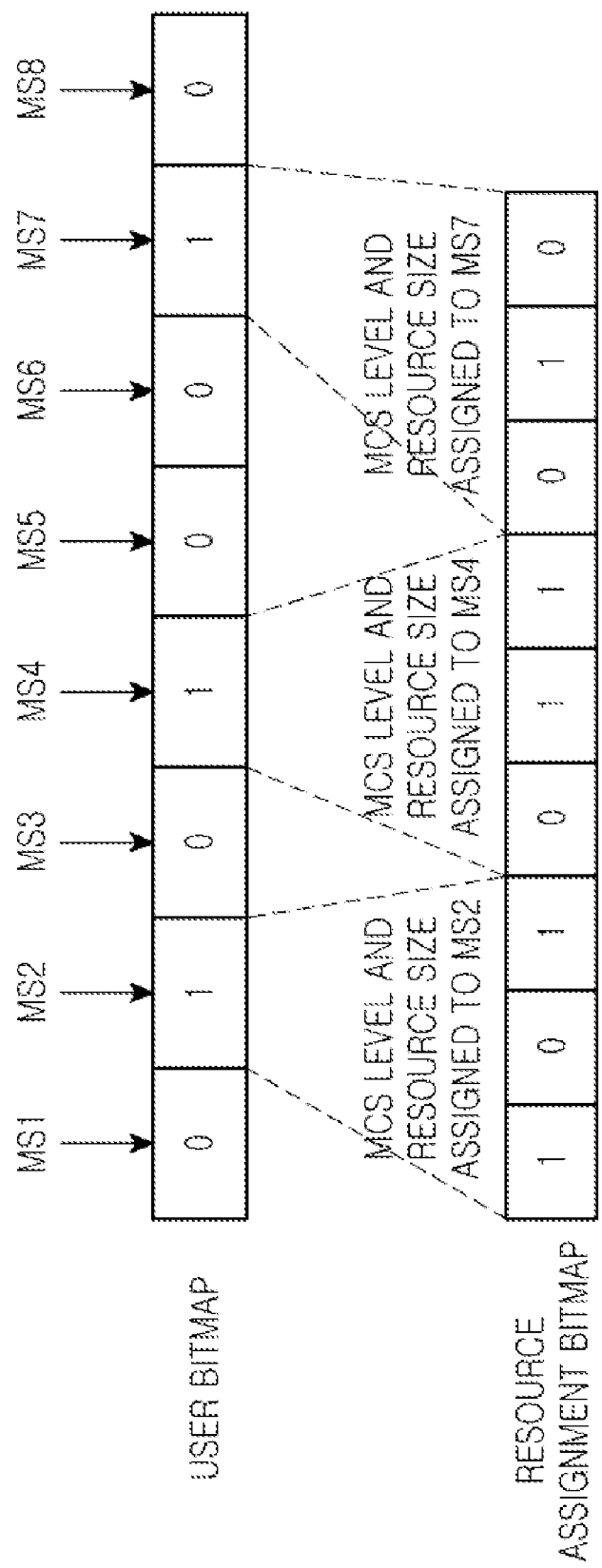
FIG. 3 is a diagram schematically showing a method for transmitting information about MSs subjected to resource deallocation using a group resource deallocation Information Element (IE) with NDA and User Bitmap Index by a Base Station (BS) in an IEEE 802.16m communication system according to an exemplary embodiment of the present invention.

FIG. 3 schematically shows a method for transmitting information about MSs subjected to resource deallocation using a group resource deallocation IE with NDA and User Bitmap Index by a BS in an IEEE 802.16m communication system according to an exemplary embodiment of the present invention.

Referring to FIG. 3, if the BS uses the group resource allocation scheme, each group is identified using a group ID, and resource allocation for the MSs in the group is indicated using the User Bitmap. Each of the MSs in the group has its bit position in the User Bitmap. Regarding which bit position each of the MSs in the group has in the User Bitmap, the BS notifies the MSs of the bit positions at the time the group is generated or changed, and a detailed description thereof will be omitted. For example, if the number of MSs in the group is

TABLE 1

| Syntax | Size in Bits | Description/Notes |
| --- | --- | --- |
| A-MAP IE Type | [4] | DL Group Resource Allocation A-MAP IE |
| Group ID | [4] | Indicate ID of group |
| Resource Offset | [6] | Indicates starting LRU for resource assignment to this group |
| ACK Channel Offset | TBD | Indicates the start of ACK index used for scheduled allocations at this subframe in the group. |
| NDA | [2] | Indicates the number of deleted AMSs in the group. |
| For(i=0,i++,i<NDA){ | | |
| User Bitmap Index | [5] | Indicates the User Bitmap Index of deleted AMSs. |
| } | | |
| User Bitmap Size | [5] | Indicates the length of User Bitmap |
| User Bitmap | Variable | Bitmap to indicate scheduled AMSs in a group. The size of the bitmap is equal to the User Bitmap Size |
| Resource Assignment Bitmap | Variable | Bitmap to indicate MCS/resource size for each scheduled AMS |
| Padding | Variable | Padding to reach byte boundary |
| MCRC | [16] | 16 bit masked CRC |

'Advanced MAP (A-MAP) IE Type' indicates a type of the A-MAP IE, and in Table 1 it indicates that the A-MAP IE is a DownLink (DL) group resource allocation A-MAP IE. 'Group ID' indicates a group Identifier (ID) of the group that the A-MAP IE targets, 'Resource Offset' indicates a starting Local Resource Unit (LRU) for resource assignment to the group, 'ACK Channel Offset' indicates the start of an ACK index used for scheduled allocations at the subframe in the group, and 'NDA' indicates the number of MSs to be deleted from the group, i.e., MSs subjected to resource deallocation. It is to be noted that the MSs are described as Advanced MSs (AMSs) in Table 1.

In addition, 'User Bitmap Index' is an index indicating to which bit the deleted AMSs (or AMSs subjected to resource deallocation) are mapped in the user bitmap. The User Bitmap Index of an MS is a kind of position value indicating the position of the bit to which the MS is mapped in the User Bitmap. 'User Bitmap Size' indicates a length of the User 8, User Bitmap of the group consists of 8 bits, and each of 8 MSs is mapped to any one of the 8 bits. In FIG. 3, it is assumed that a total of, for example, 8 MSs (MS1 to MS8) are included in one group.

In an exemplary implementation, if the value of a particular bit is '1' in the User Bitmap, it indicates that a resource is allocated to the MS mapped to the bit. If the value of a particular bit is '0' in the User Bitmap, it indicates that no resource is allocated to the MS mapped to the bit. The bit value is '0', i.e., no resource is allocated to the MS, (i) when the resource is deallocated due to the MS's call completion, (ii) when the user has entered a silence state in which the user is listening without words during a call, (iii) when the MS is deleted from the group, and/or (iv) when resource allocation is suspended at the current subframe. The bit value is also '0' when no MS is mapped to the bit.

Thus, MSs mapped to the bits having a bit value of '1' in the User Bitmap are allocated resources. Herein, the MSs that are allocated resources will be referred to as 'active MSs'. Resource allocation information for each of the active MSs is indicated in Resource Assignment Bitmap, and each active MS starts being allocated resources in turn at the resource allocation start position corresponding to Resource Offset according to the resource allocation information indicated in Resource Assignment Bitmap. The Resource Assignment Bitmap includes resource allocation information for the MSs mapped to the bits having a bit value '1' in the User Bitmap. It is shown in FIG. 3 that the Resource Assignment Bitmap includes resource allocation information consisting of, for example, 3 bits for each of the MSs. The bit value of 3 bits indicates an MCS level and resource size assigned to the MS. Resource allocation order for the active MSs is determined in the User Bitmap according to the order of the active MSs.

ACK channels used by the active MSs are determined sequentially beginning from the ACK channel start index corresponding to ACK Channel Offset. A group resource deallocation IE is transmitted when the resource is deallocated due to call completion of an active MS, or when the active MS is deleted from the group. The group resource deallocation IE includes NDA indicating the number of MSs subjected to resource deallocation, and an index of User Bitmap of the MSs subjected to resource deallocation. A length of the User Bitmap Index is determined based on the maximum length of the User Bitmap. If the IEEE 802.16m communication system has, for example, a 10 MHz bandwidth, the length of the User Bitmap Index is determined as 5 bits, and if the system has a 20 MHz bandwidth, the length of the User Bitmap Index is determined as 6 bits.

An exemplary method of transmitting information about the MSs subjected to resource deallocation using the group resource deallocation IE with NDA and User Bitmap Index has been described so far with reference to Table 1 and FIG. 3.

It is also possible to transmit the information about the MSs subjected to resource deallocation using a group resource deallocation IE with NDA and Deallocated User Index, and a description thereof will be made with reference to FIG. 4 and Table 2.

Figure 4:
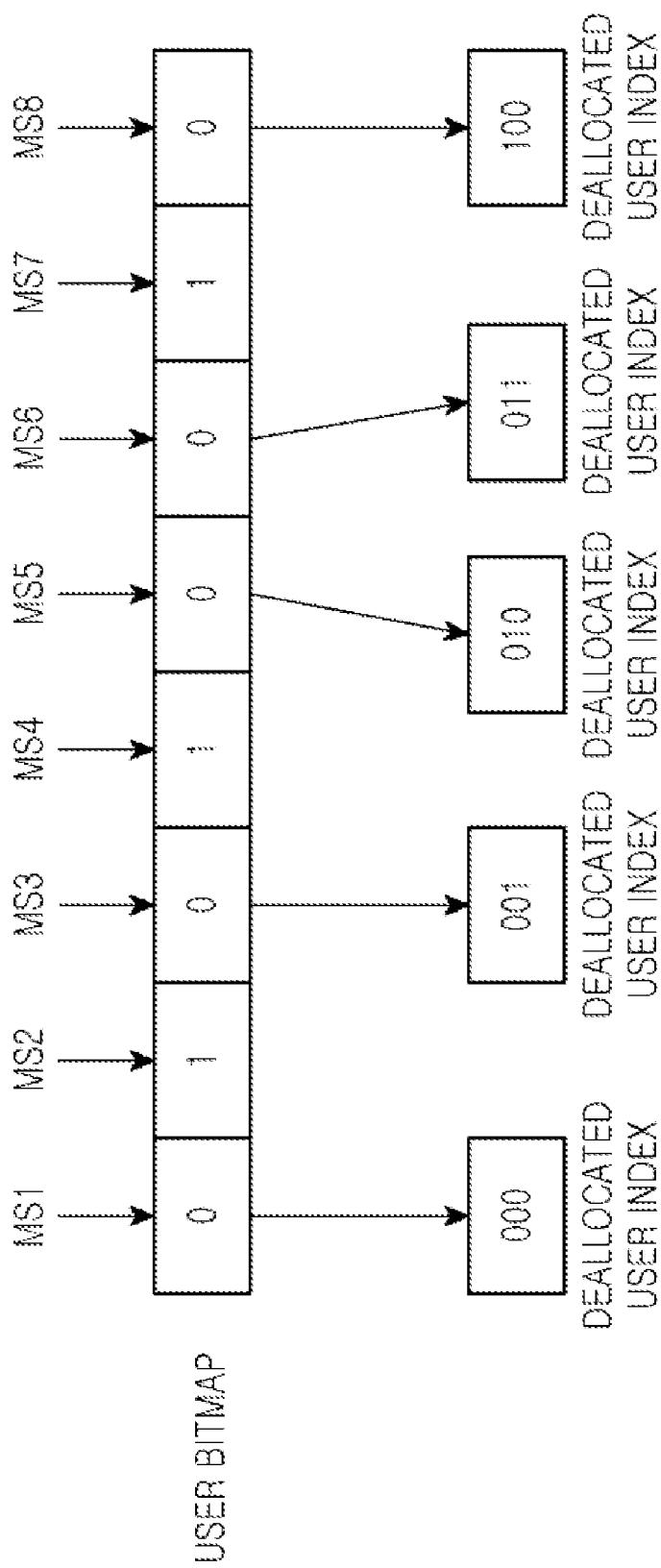
FIG. 4 is a diagram schematically showing a method for transmitting information about Mobile Stations (MSs) subjected to resource deallocation using a group resource deallocation IE with NDA and Deallocated User Index by a BS in an IEEE 802.16m communication system according to an exemplary embodiment of the present invention.

FIG. 4 schematically shows a method for transmitting information about MSs subjected to resource deallocation using a group resource deallocation IE with NDA and Deallocated User Index by a BS in an IEEE 802.16m communication system according to an exemplary embodiment of the present invention.

Referring to FIG. 4, the Deallocated User Index indicates an index of an MS having a bit value of '0' in User Bitmap, and a length of the Deallocated User Index is determined to correspond to the number of MSs having a bit value of '0' in the User Bitmap. MSs having a bit value of '0' in the User Bitmap are inactive MSs to which no resource is allocated in the current group resource deallocation IE. Thus, the length of the Deallocated User Index is realized as Ceillog2 (Number of Inactive users in User Bitmap) bits.

Transmitting the information about the MSs subjected to resource deallocation using the group resource deallocation IE with NDA and Deallocation User Index as described in FIG. 4 can reduce the number of required bits compared with transmitting the information using the group resource deallocation IE with NDA and User Bitmap Index, which has been described with reference to Table 1 and FIG. 3. That is, in Table 1 and FIG. 3, the length of User Bitmap Index is determined on the basis of the case where the User Bitmap has the maximum length, and during resource deallocation for MSs, resource deallocation information for the MSs is transmitted using User Bitmap Indexes of the MSs.

However, in FIG. 4, the length of Deallocated User Index is determined to correspond to the number of MSs having a bit value of '0' in User Bitmap, and during resource deallocation for MSs, resource deallocation information for the MSs is transmitted using Deallocated User Indexes of the MSs, thereby reducing the number of bits required to transmit the group resource deallocation IE.

An exemplary format of the group resource deallocation IE with NDA and Deallocated User Index is as shown in Table 2 below.

TABLE 2

| Syntax | Size in bits | Description/Notes |
| --- | --- | --- |
| A-MAP IE Type | [4] | DL Group Resource Allocation A-MAP IE |
| Group ID | [4] | Indicate ID of group |
| Resource Offset | [6] | Indicates starting LRU for resource assignment to this group |
| ACK Channel Offset | TBD | Indicates the start of ACK index used for scheduled allocations at this subframe in the group. |
| User Bitmap Size | [5] | Indicates the length of User Bitmap |
| User Bitmap | Variable | Bitmap to indicate scheduled AMSs in a group. The size of the bitmap is equal to the User Bitmap Size |
| NDA | [2] | Indicates the number of deleted AMSs in the group. |
| For(i=0,i++,i<NDA){ | | |
| Deallocated User Index | Variable | Indicate deallocated users The length of Deallocated User Index determined as Ceil{(log2(Number of Inactive users in User Bitmap)}. |
| } | | |
| Resource Assignment Bitmap | Variable | Bitmap to indicate MCS/resource size for each scheduled AMS |
| Padding | Variable | Padding to reach byte boundary |
| MCRC | [16] | 16 bit masked CRC |

Meanwhile, it is also possible to transmit the information about the MSs subjected to resource deallocation using a group resource deallocation IE with Deallocation Flag and Deallocated User Bitmap, and a description thereof will be given with reference to FIG. 5 and Table 3.

Figure 5:
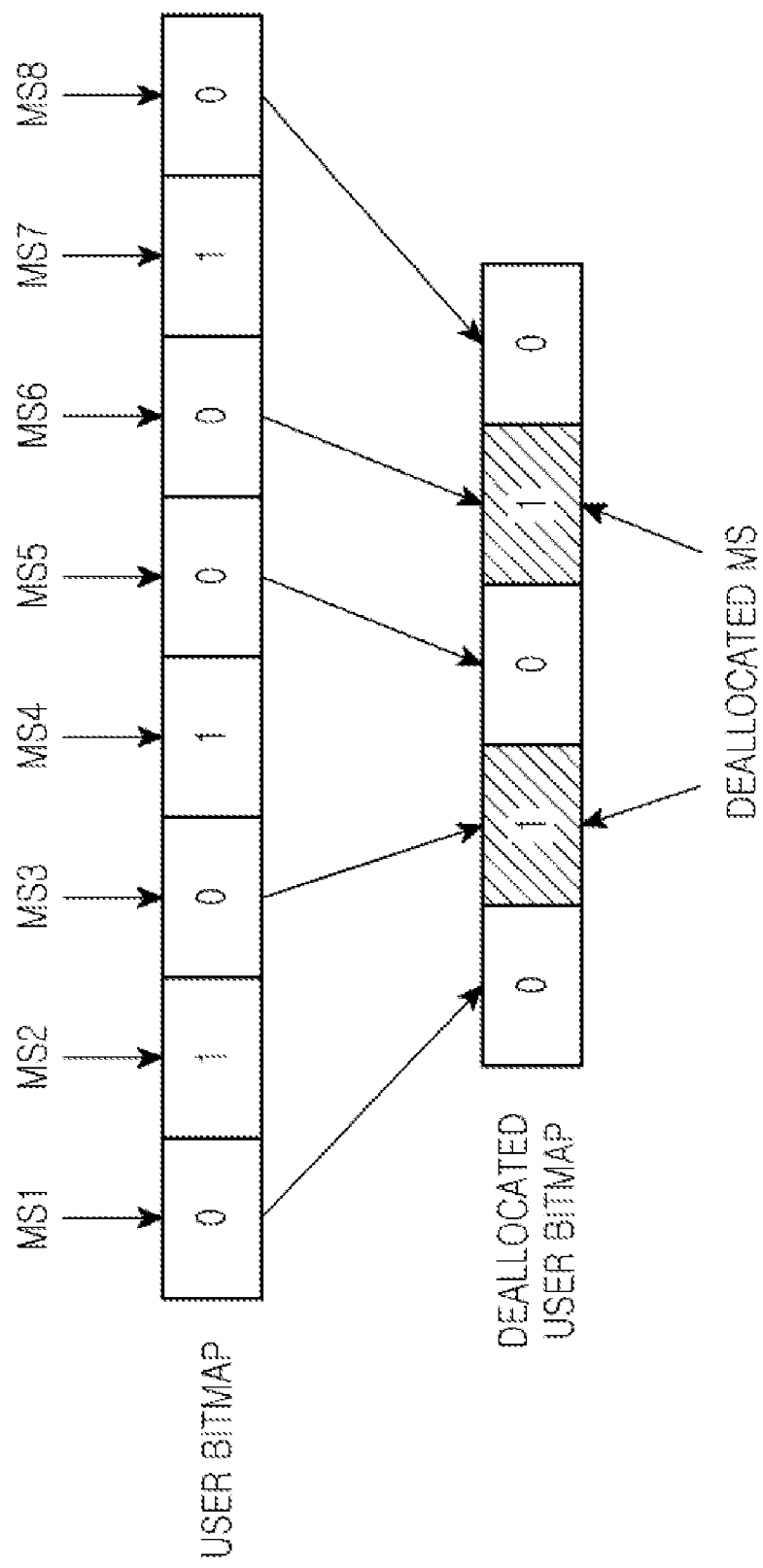
FIG. 5 is a diagram schematically showing a method for transmitting information about MSs subjected to resource deallocation using a group resource deallocation IE with Deallocation Flag and Deallocated User Bitmap by a BS in an IEEE 802.16m communication system according to an embodiment of the present invention.

FIG. 5 schematically shows a method for transmitting information about MSs subjected to resource deallocation using a group resource deallocation IE with Deallocation Flag and Deallocated User Bitmap by a BS in an IEEE 802.16m communication system according to an exemplary embodiment of the present invention.

Referring to FIG. 5, a Deallocated User Bitmap is generated using MSs having a bit value of '0' in the User Bitmap. That is, a length of the Deallocated User Bitmap is determined to correspond to the number of inactive MSs in the User Bitmap.

of MSs subjected to resource deallocation. Thus, if the Deallocation Flag has a value of '1', the Deallocated User Bitmap is transmitted, and if the Deallocation Flag has a value of '0', the Deallocated User Bitmap is not transmitted.

When the Deallocated User Bitmap is used, it is possible to notify the MSs of the resource deallocation using only the Deallocated User Bitmap without the information indicating the number of MSs subjected to resource deallocation. The Deallocated User Bitmap is effective especially when, in the User Bitmap, the number of MSs whose bit values are indicated as '0' is relatively small or the number of MSs subjected to resource deallocation is relatively large.

An exemplary format of the group resource deallocation IE with Deallocation Flag and Deallocated User Bitmap is as shown in Table 3 below.

TABLE 3

| Syntax | Size in bits | Description/Notes |
| --- | --- | --- |
| A-MAP IE Type | [4] | DL Group Resource Allocation A-MAP IE |
| Group ID | [4] | Indicate ID of group |
| Resource Offset | [6] | Indicates starting LRU for resource assignment to this group |
| ACK Channel Offset | TBD | Indicates the start of ACK index used for scheduled allocations at this subframe in the group. |
| User Bitmap Size | [5] | Indicates the length of User Bitmap |
| User Bitmap | Variable | Bitmap to indicate scheduled AMSs in a group. The size of the bitmap is equal to the User Bitmap Size |
| Deallocation Flag | [1] | Indicates the existence of deallocated users<br>0: No deallocated user<br>1: There are some deallocated users. |
| If (Deallocation Flag ==1) { | | |
| Deallocated User Bitmap | Variable | Indicate deallocated users<br>The length of Deallocated User Bitmap determined as the number of inactive users in User Bitmap. |
| Resource Assignment Bitmap | Variable | Bitmap to indicate MCS/resource size for each scheduled AMS |
| Padding | Variable | Padding to reach byte boundary |
| MCRC | [16] | 16 bit masked CRC |

In the Deallocated User Bitmap, a bit value of bits mapped to MSs subjected to resource deallocation is indicated as '1', and a bit value of bits mapped to the MSs that have entered the silence state, bits mapped to the MSs, resource allocation to which is suspended at the current subframe, and/or bits to which no MS is mapped, is indicated as '0'.

Because the Deallocated User Bitmap is transmitted only when there are MSs subjected to resource deallocation, Deallocation Flag indicating the presence/absence of MSs subjected to resource deallocation is needed. If the Deallocation Flag has, for example, a value of '1', it indicates the presence of MSs subjected to resource deallocation. In contrast, if the Deallocation Flag has a value of '0', it indicates the absence It is also possible to transmit the information about MSs subjected to resource deallocation using a group resource deallocation IE including Deallocation Type, N_Deallocated_User indicating the number of MSs subjected to resource deallocation to correspond to a value of the Deallocation Type, Deallocated User Index, and Deallocated User Bitmap, and a description thereof will be given with reference to Table 4.

Table 4 shows an exemplary format of a group resource deallocation IE that includes N_Deallocated_User corresponding to a value of Deallocation Type, Deallocated User Index, and Deallocated User Bitmap.

TABLE 4

| Syntax | Size in bits | Description/Notes |
|---|---|---|
| A-MAP IE Type | [4] | DL Group Resource Allocation A-MAP IE |
| Group ID | [4] | Indicate ID of group |
| Resource Offset | [6] | Indicates starting LRU for resource assignment to this group |
| ACK Channel Offset | TBD | Indicates the start of ACK index used for scheduled allocations at this subframe in the group. |
| User Bitmap Size | [5] | Indicates the length of User Bitmap |
| User Bitmap | Variable | Bitmap to indicate scheduled AMSs in a group. The size of the bitmap is equal to the User Bitmap Size |
| Deallocation Type | [2] | Indicates the method for deallocation<br>00: No deallocation<br>01: Deallocated User Index Type<br>10: Deallocated User Bitmap Type<br>11: Reserved |
| If (Deallocation Type ==01)<br>{ | | |
|    N_Deallocated_User | [2] | Indicates the number of deallocated users in the group from 1 to 4. |
| For(i=0;i<N_Deallocated_User;++i)<br>   { | | |
|       Deallocated User Index | Variable | Indicate deallocated users<br>The length of Deallocated User Index determined as<br>Ceil{(log2(Number of Inactive users in User Bitmap)} |
|    }<br>}<br>If (Deallocation Type ==10)<br>{ | | |
|    Deallocated User Bitmap | Variable | Indicate deallocated users<br>The length of Deallocated User Bitmap determined as the number of inactive users in User Bitmap. |
|    }<br>Resource Assignment Bitmap | Variable | Bitmap to indicate MCS/resource size for each scheduled AMS |
| Padding | Variable | Padding to reach byte boundary |
| MCRC | [16] | 16 bit masked CRC |

In Table 4, 'Deallocation Type' indicates a method in which the group resource deallocation IE indicates MSs subjected to resource deallocation. If its value is, for example, '00', it indicates the absence of MSs subjected to resource deallocation, and if its value is, for example, '01', it indicates that the MSs subjected to resource deallocation are to be indicated in a Deallocated User Index type. If the value is, for example, '10', it indicates that the MSs subjected to resource deallocation are to be indicated in a Deallocated User Bitmap type. The Deallocated User Index type indicates a type indicating MSs subjected to resource deallocation with a method using Deallocated User Index, and the Deallocated User Bitmap type indicates a type indicating MSs subjected to resource deallocation with a method using Deallocated User Bitmap.

If a value of the Deallocation Type is '01', the group resource deallocation IE includes the N_Deallocated_User and Deallocated User Index, and if a value of the Deallocation Type is '10', the group resource deallocation IE includes the Deallocated User Bitmap.

Next, an internal structure of a BS in an IEEE 802.16m communication system according to an exemplary embodiment of the present invention will be described with reference to FIG. 6.

Figure 6:
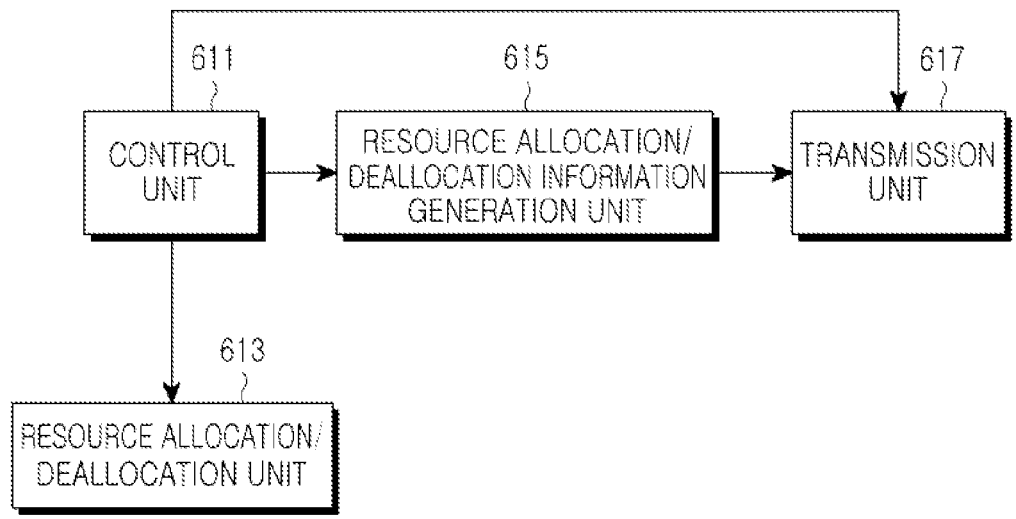
FIG. 6 is a diagram showing an internal structure of a BS in an IEEE 802.16m communication system according to an exemplary embodiment of the present invention.

FIG. 6 shows an internal structure of a BS in an IEEE 802.16m communication system according to an exemplary embodiment of the present invention.

Referring to FIG. 6, the BS includes a control unit 611, a resource allocation/deallocation unit 613, a resource allocation/deallocation information generation unit 615, and a transmission unit 617.

The control unit 611 controls the overall operation of the BS. The resource allocation/deallocation unit 613, under the control of the control unit 611, allocates resources to MSs using the individual resource allocation scheme or the group resource allocation scheme, or deallocates the resources allocated to the MSs.

The resource allocation/deallocation information generation unit 615, under the control of the control unit 611, generates individual resource allocation information, individual resource deallocation information, group resource allocation information, and/or group resource deallocation information. An exemplary operation of deallocating the resources allocated using the group resource allocation scheme and then generating group resource deallocation information indicating the deallocation by the resource allocation/deallocation information generation unit 615 has been described with reference to FIGS. 2 to 5 and Tables 1 to 4, so a detailed description thereof will be omitted for simplicity. The transmission unit 617 transmits the individual resource allocation information, the individual resource deallocation information, the group resource allocation information and/or the group resource deallocation information generated by the resource allocation/deallocation information generation unit 615.

In conclusion, the BS is a resource allocation/deallocation information transmission device for transmitting resource allocation/deallocation information.

Next, an internal structure of an MS in an IEEE 802.16m communication system according to an exemplary embodiment of the present invention will be described with reference to FIG. 7.

Figure 7:
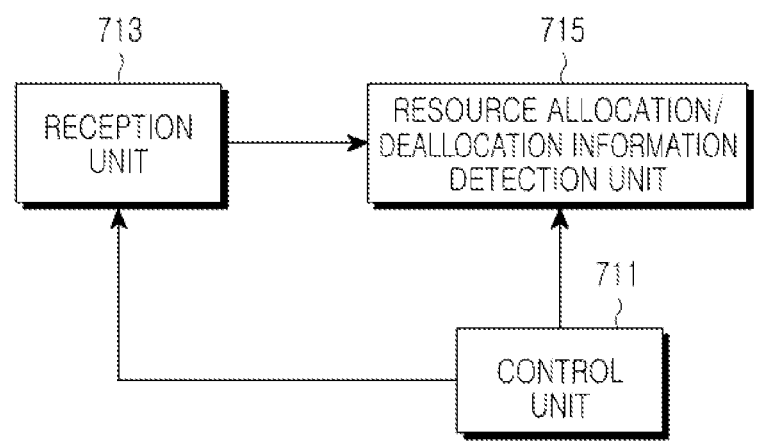
FIG. 7 is a diagram showing an internal structure of an MS in an IEEE 802.16m communication system according to an exemplary embodiment of the present invention.

FIG. 7 shows an internal structure of an MS in an IEEE 802.16m communication system according to an exemplary embodiment of the present invention.

Referring to FIG. 7, the MS includes a control unit 711, a reception unit 713, and a resource allocation/deallocation information detection unit 715.

The control unit 711 controls the overall operation of the MS. The reception unit 713 performs reception processing on a signal received from the BS and outputs the received signal to the resource allocation/deallocation information detection unit 715. The resource allocation/deallocation information detection unit 715 detects individual resource allocation information, individual resource deallocation information, group resource allocation information, and/or group resource deallocation information from the signal output from the reception unit 713. The group resource deallocation information has been described in conjunction with FIGS. 2 to 5 and Tables 1 to 4, so a detailed description thereof will be omitted for simplicity.

In conclusion, the MS is a resource allocation/deallocation information reception device for receiving resource allocation/deallocation information.

Next, an operation of a BS in an IEEE 802.16m communication system according to an exemplary embodiment of the present invention will be described with reference to FIG. 8.

Figure 8:
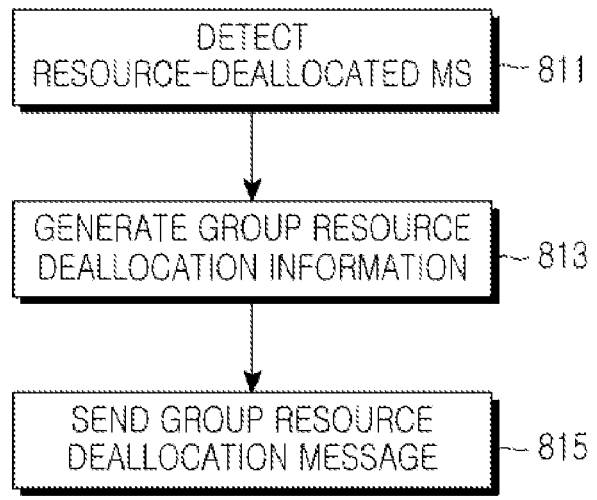
FIG. 8 is a flowchart showing an operation of a BS in an IEEE 802.16m communication system according to an exemplary embodiment of the present invention.

FIG. 8 shows an operation of a BS in an IEEE 802.16m communication system according to an exemplary embodiment of the present invention.

Referring to FIG. 8, in step 811, the BS determines the presence of MSs subjected to resource deallocation (or resource-deallocated MSs) among the MSs to which it allocated resources using the group resource allocation scheme. In step 813, the BS generates group resource deallocation information. The group resource deallocation information has been described with reference to FIGS. 2 to 5 and Tables 1 to 4, so a detailed description thereof will be omitted for simplicity. In step 815, the BS sends a group resource deallocation message including the generated group resource deallocation information. Next, an operation of an MS in an IEEE 802.16m communication system according to an exemplary embodiment of the present invention will be described with reference to FIGS. 9 and 10.

Figure 9:
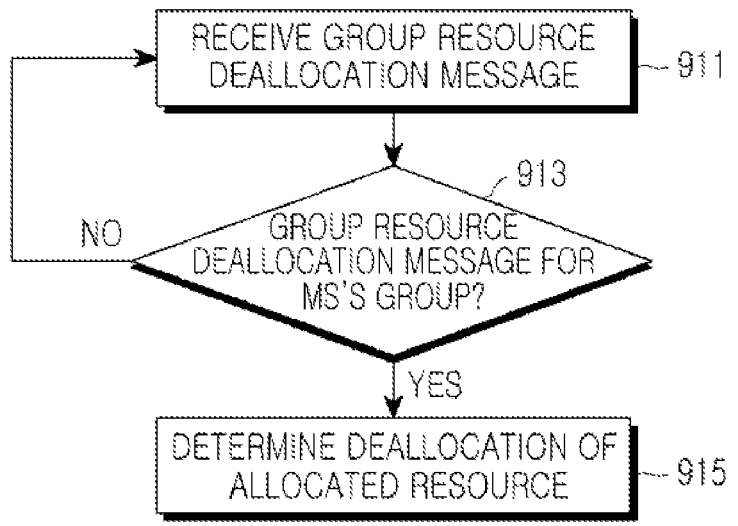
FIG. 9 is a flowchart showing an operation of an MS in an IEEE 802.16m communication system according to an exemplary embodiment of the present invention.

FIG. 9 is a flowchart showing an operation of an MS in an IEEE 802.16m communication system according to an exemplary embodiment of the present invention.

Referring to FIG. 9, in step 911, the MS receives a group resource deallocation message. In step 913, the MS determines whether the group resource deallocation message is for the group to which the MS belongs. In an exemplary implementation, the MS determines whether the group resource deallocation message is for the group to which the MS belongs by checking CRC using a masked sequence assigned to the group. If it is determined in step 913 that the received group resource deallocation message is a group resource deallocation message for the group to which the MS belongs, the MS determines whether the resource allocated to the MS itself is deallocated, by using the group resource deallocation information included in the group resource deallocation message in step 915. The group resource deallocation information has been described with reference to FIGS. 2 to 5 and Tables 1 to 4, so a detailed description thereof will be omitted for simplicity.

Figure 10:
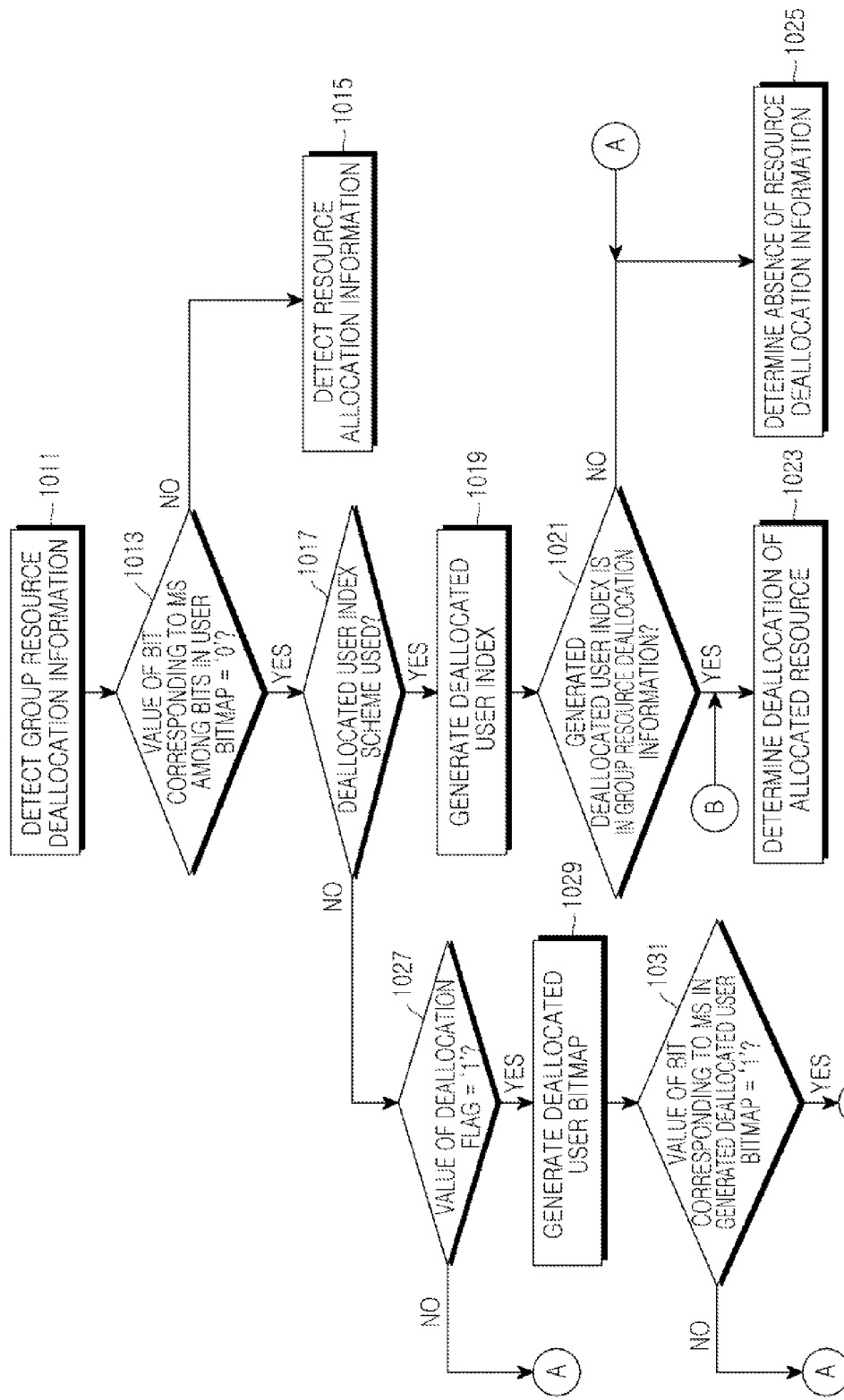
FIG. 10 is a flowchart showing an operation of an MS in an IEEE 802.16m communication system according to an exemplary embodiment of the present invention.

FIG. 10 is a flowchart showing an operation of an MS in an IEEE 802.16m communication system according to an exemplary embodiment of the present invention.

Referring to FIG. 10, in step 1011, the MS detects group resource deallocation information. The MS may detect group resource deallocation information for the group to which the MS itself belongs, by checking the presence/absence of group resource deallocation information for the group in which the MS is included, at every subframe.

In step 1013, the MS determines whether a bit value of a bit corresponding to the MS is '0' among the bits in User Bitmap included in the detected group resource deallocation information. If it is determined that the bit value is not '0' but is '0', the MS detects the resource allocation information allocated to the MS itself in step 1015.

However, if it is determined in step 1013 that the bit value is '0', the MS determines in step 1017 whether the IEEE 802.16m communication system uses a Deallocated User Index scheme (or type). If it is determined in step 1017 that the IEEE 802.16m communication system uses the Deallocated User Index scheme, the MS generates its Deallocated User Index using a bit having a bit value of '0' in the User Bitmap in step 1019. A length of the Deallocated User Index is Ceillog2 (Number of Inactive users in User Bitmap), and the smaller the MS's User Index is, the smaller the Deallocated User Index becomes.

In step 1021, the MS determines whether the generated Deallocated User Index is included in the group resource deallocation information. If it is determined in step 1021 that the generated Deallocated User Index is included in the group resource deallocation information, the MS determines the deallocation of the resource that was allocated to the MS, in step 1023.

However, if it is determined in step 1021 that the generated Deallocated User Index is not included in the group resource deallocation information, the MS determines the absence of resource deallocation information for the MS in step 1025.

If it is determined in step 1017 that the IEEE 802.16m communication system uses not the Deallocated User Index scheme, but the Deallocated User Bitmap scheme, the MS determines in step 1027 whether a value of Deallocation Flag included in the group resource deallocation information is '1'. If it is determined in step 1027 that the value of Deallocation Flag included in the group resource deallocation information is not '1' but is '0', the MS proceeds to step 1025.

However, if it is determined in step 1027 that the value of the Deallocation Flag included in the group resource deallocation information is '1', the MS generates a Deallocated User Bitmap using a bit having a bit value of '0' in the User Bitmap in step 1029. A length of the Deallocated User Bitmap is equal to the number of bits having a bit value of '0' in the User Bitmap, and as the MS's User Index is smaller, a leading bit among the bits included in the Deallocated User Bitmap corresponds to the MS. In step 1031, the MS detects a bit corresponding to the MS in the generated Deallocated User Bitmap, and determines whether a bit value of the detected bit is '1'. If it is determined in step 1031 that the bit value of the detected bit is not '1', the MS proceeds to step 1025. However, if it is determined in step 1031 that the bit value of the detected bit is '1', the MS proceeds to step 1023.

The MS's operations described in FIGS. 9 and 10 are performed by means of the reception unit 713 and the resource allocation/deallocation information detection unit 715 under the control of the control unit 711, as described in FIG. 7.

As is apparent from the foregoing description, exemplary embodiments of the present invention provide for transmission and reception of group resource deallocation information using parameters such as Deallocated User Index, Deallocation Flag, Deallocated User Bitmap, Deallocation Type, and NDA (indicating the number of users subjected to resource deallocation), enabling transmission/reception of the group resource deallocation information to reduce the entire system overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting group resource deallocation information by a Base Station (BS) in a communication system, the method comprising:
   transmitting group resource deallocation information to a plurality of Mobile Stations (MSs),
   wherein the group resource deallocation information includes first information indicating a group including the plurality of MSs, and second information indicating whether a resource allocated to each of the plurality of MSs is to be deallocated,
   wherein deallocated MSs subjected to the resource deallocation among the plurality of MSs are indicated by one of a deallocated user index configured by indexes mapped to the deallocated MSs and deallocated user bitmap information including values corresponding to the deallocated MSs, and
   wherein a length of the deallocated user index is determined based on the number of deallocated MSs.

2. The method of claim 1, wherein if the deallocated MSs are indicated by the deallocated user index, the second information includes a user bitmap wherein if a relevant bit indicates a first bit value then no resource is allocated to an MS mapped to the relevant bit, the number of deallocated MSs, and deallocated user indexes mapped to the deallocated MSs among MSs mapped to bits indicating the first bit value in the user bitmap.

3. The method of claim 1, wherein if the deallocated MSs are indicated by the deallocated user bit map information, the second information includes a user bitmap wherein if a relevant bit indicates a first bit value then no resource is allocated to an MS mapped to the relevant bit, a deallocation flag indicating presence/absence of the deallocated MSs, and a deallocated user bitmap indicating whether a resource allocated to each of MSs mapped to bits indicating the first bit value is deallocated in the user bitmap if the deallocation flag indicates the presence of the deallocated MSs, and indicating that, if a relevant bit indicates a second bit value, MSs mapped to bits indicating the second bit value are the deallocated MSs.

4. The method of claim 1, wherein the second information includes a user bitmap wherein if a relevant bit indicates a first bit value then no resource is allocated to an MS mapped to the relevant bit, and a deallocation type indicating whether the group resource deallocation information is to be indicated by any one of the deallocated user index and the deallocated user bitmap information, wherein if the deallocation type indicates that the group resource deallocation information is to be indicated by the deallocated user index, the second information includes the number of the deallocated MSs, and the deallocated user indexes mapped to the deallocated MSs among MSs mapped to bits indicating the first bit value in the user bitmap, and if the deallocation type indicates that the group resource deallocation information is to be indicated by the deallocated user bitmap information, the second information includes a deallocated user bitmap indicating whether a resource allocated to each of the MSs mapped to bits indicating the first bit value is deallocated in the user bitmap, and indicating that if a relevant bit indicates a second bit value, MSs mapped to bits indicating the second bit value are the deallocated MSs.

5. A method for receiving group resource deallocation information by a Mobile Station (MS) in a communication system, the method comprising:
   receiving group resource deallocation information from a Base Station (BS),
   wherein the group resource deallocation information includes first information indicating a group including a plurality of MSs receiving the group resource deallocation information, and second information indicating whether a resource allocated to each of the plurality of MSs is to be deallocated,
   wherein deallocated MSs subjected to the resource deallocation among the plurality of MSs are indicated by one of a deallocated user index configured by indexes mapped to the deallocated MSs and deallocated user bitmap information including values corresponding to the deallocated MSs, and
   wherein a length of the deallocated user index is determined based on the number of the deallocated MSs.

6. The method of claim 5, wherein if the deallocated MSs are indicated by the deallocated user index, the second information includes a user bitmap wherein if a relevant bit indicates a first bit value then no resource is allocated to an MS mapped to the relevant bit, the number of the deallocated MSs, and deallocated user indexes mapped to the deallocated MSs among MSs mapped to bits indicating the first bit value in the user bitmap.

7. The method of claim 6, further comprising:
   after receiving the group resource deallocation information, generating a deallocated user index of the MS using bits having the first bit value in the user bitmap; and
   determining whether the resource allocated to the MS is deallocated if the generated deallocated user index is included in the group resource deallocation information.

8. The method of claim 5, wherein if the deallocated MSs are indicated by the deallocated user bitmap information, the second information includes a user bitmap wherein if a relevant bit indicates a first bit value then no resource is allocated to an MS mapped to the relevant bit, a deallocation flag indicating presence/absence of the deallocated MSs, and a deallocated user bitmap indicating whether a resource allocated to each of MSs mapped to bits indicating the first bit value is deallocated in the user bitmap if the deallocation flag indicates the presence of the deallocated MSs, and indicating that if a relevant bit indicates a second bit value, MSs mapped to bits indicating the second bit value are the deallocated MSs.

9. The method of claim 8, further comprising:
   after receiving the group resource deallocation information, generating a deallocated user bitmap using bits having the first bit value in the user bitmap if the deallocation flag indicates the presence of MSs subjected to resource deallocation; and
   detecting a bit corresponding to the MS among bits included in the generated deallocated user bitmap, and determining whether the resource allocated to the MS is deallocated, if a bit value of the detected bit indicates the second bit value.

10. The method of claim 5, wherein the second information includes a user bitmap wherein if a relevant bit indicates a first bit value then no resource is allocated to an MS mapped to the relevant bit, and a deallocation type indicating whether the group resource deallocation information is to be indicated by one of the deallocated user index and the deallocated user bitmap information, wherein if the deallocation type indicates that the group resource deallocation information is to be indicated by the deallocated user index, the second information includes the number of the deallocated MSs, and the deallocated user indexes mapped to the deallocated MSs among MSs mapped to bits indicating the first bit value in the user bitmap, and if the deallocation type indicates that the group resource deallocation information is to be indicated by the deallocated user bitmap information, the second information includes a deallocated user bitmap indicating whether a resource allocated to each of the MSs mapped to bits indicating the first bit value is deallocated in the user bitmap, and indicating that if a relevant bit indicates a second bit value, MSs mapped to bits indicating the second bit value are the deallocated MSs.

11. A Base Station (BS) in a communication system, the BS comprising:
a transmission unit for transmitting group resource deallocation information to a plurality of Mobile Stations (MSs),
wherein the group resource deallocation information includes first information indicating a group including the plurality of MSs, and second information indicating whether a resource allocated to each of the MSs is to be deallocated,
wherein deallocated MSs subjected to the resource deallocation among the plurality of MSs are indicated by one of a deallocated user index configured by indexes mapped to the deallocated MSs and deallocated user bitmap information including values corresponding to the deallocated MSs, and
wherein a length of the deallocated user index is determined based on the number of the deallocated MSs.

12. The BS of claim 11, wherein if the deallocated MSs are indicated by the deallocated user index, the second information includes a user bitmap wherein if a relevant bit indicates a first bit value then no resource is allocated to an MS mapped to the relevant bit, the number of the deallocated MSs, and deallocated user indexes mapped to the deallocated MSs among MSs mapped to bits indicating the first bit value in the user bitmap.

13. The BS of claim 11, wherein if the deallocated MSs are indicated by the deallocated user bitmap information, the second information includes a user bitmap wherein if a relevant bit indicates a first bit value then no resource is allocated to an MS mapped to the relevant bit, a deallocation flag indicating presence/absence of the deallocated MSs among the plurality of MSs, and a deallocated user bitmap indicating whether a resource allocated to each of MSs mapped to bits indicating the first bit value is deallocated in the user bitmap if the deallocation flag indicates the presence of the deallocated MSs, and indicating that if a relevant bit indicates a second bit value, MSs mapped to bits indicating the second bit value are the deallocated MSs.

14. The BS of claim 11, wherein the second information includes a user bitmap wherein if a relevant bit indicates a first bit value then no resource is allocated to an MS mapped to the relevant bit, and a deallocation type indicating whether the group resource deallocation information is to be indicated by one of the deallocated user index and the deallocated user bitmap information, wherein if the deallocation type indicates that the group resource deallocation information is to be indicated by the deallocated user index, the second information includes the number of the deallocated MSs, and the deallocated user indexes mapped to the deallocated MSs among MSs mapped to bits indicating the first bit value in the user bitmap, and if the deallocation type indicates that the group resource deallocation information is to be indicated by the deallocated user bitmap information, the second information includes a deallocated user bitmap indicating whether a resource allocated to each of the MSs mapped to bits indicating the first bit value is deallocated in the user bitmap, and indicating that if a relevant bit indicates a second bit value, MSs mapped to bits indicating the second bit value are the deallocated MSs.

15. A Mobile Station (MS) in a communication system, the MS comprising:
a reception unit for receiving group resource deallocation information from a Base Station (BS),
wherein the group resource deallocation information includes first information indicating a group including a plurality of MSs receiving the group resource deallocation information, and second information indicating whether resource allocated to each of the plurality of MSs is to be deallocated,
wherein deallocated MSs subjected to the resource deallocation among the plurality of MSs are indicated by one of a deallocated user index configured by indexes mapped to the deallocated MSs and deallocated user bitmap information including values corresponding to the deallocated MSs, and
wherein a length of the deallocated user index is determined based on the number of the deallocated MSs.

16. The MS of claim 15, wherein if the deallocated MSs are indicated by the deallocated user index, the second information includes a user bitmap wherein if a relevant bit indicates a first bit value then no resource is allocated to an MS mapped to the relevant bit, the number of the deallocated MSs, and deallocated user indexes mapped to the deallocated MSs among MSs mapped to bits indicating the first bit value in the user bitmap.

17. The MS of claim 16, further comprising a resource deallocation information detection unit for generating a deallocated user index of the MS using bits having the first bit value in the user bitmap, and for determining whether the resource allocated to the MS is deallocated, if the generated deallocated user index is included in the group resource deallocation information.

18. The MS of claim 15, wherein if the deallocated MSs are indicated by the deallocated user bitmap information, the second information includes a user bitmap wherein if a relevant bit indicates a first bit value then no resource is allocated to an MS mapped to the relevant bit, a deallocation flag indicating presence/absence of the deallocated MSs among the plurality of MSs, and a deallocated user bitmap indicating whether a resource allocated to each of MSs mapped to bits indicating the first bit value is deallocated in the user bitmap if the deallocation flag indicates the presence of the deallocated MSs, and indicating that if a relevant bit indicates a second bit value, MSs mapped to bits indicating the second bit value are the deallocated MSs.

19. The MS of claim 18, further comprising a resource deallocation information detection unit for generating a deallocated user bitmap using bits having the first bit value in the user bitmap if the deallocation flag indicates the presence of MSs subjected to resource deallocation, for detecting a bit corresponding to the MS among bits included in the generated deallocated user bitmap, and for determining whether the resource allocated to the MS is deallocated, if a bit value of the detected bit indicates the second bit value.

20. The MS of claim 15, wherein the second information includes a user bitmap wherein if a relevant bit indicates a first bit value then no resource is allocated to an MS mapped to the relevant bit, and a deallocation type indicating whether the group resource deallocation information is to be indicated by one of the deallocated user index and the deallocated user bitmap information, wherein if the deallocation type indicates that the group resource deallocation information is to be indicated by the deallocated user index, the second information includes the number of the deallocated MSs, and the deallocated user indexes mapped to the deallocated MSs among MSs mapped to bits indicating the first bit value in the user bitmap, and if the deallocation type indicates that the group resource deallocation information is to be indicated by the deallocated user bitmap information, the second information includes a deallocated user bitmap indicating whether a resource allocated to each of the MSs mapped to bits indicating the first bit value is deallocated in the user bitmap, and indicating that if a relevant bit indicates a second bit value, MSs mapped to bits indicating the second bit value are the deallocated MSs.

* * * * *